United States Patent [19]

Kobayashi et al.

[11] Patent Number: 4,745,492
[45] Date of Patent: May 17, 1988

[54] VIDEO SIGNAL DIGITAL PROCESSING SYSTEM USING LOWER SAMPLING FREQUENCY FOR CHROMA SIGNAL DATA DECIMATION

[75] Inventors: Kaoru Kobayashi, Yokohama; Hidetoshi Ozaki, Chofu, both of Japan

[73] Assignee: Victor Company of Japan, Ltd., Tokyo, Japan

[21] Appl. No.: 781,939

[22] Filed: Sep. 30, 1985

[30] Foreign Application Priority Data

Sep. 29, 1984 [JP] Japan .................................. 59-205111
Sep. 29, 1984 [JP] Japan .................................. 59-205112
Sep. 29, 1984 [JP] Japan .................................. 59-205113
Oct. 4, 1984 [JP] Japan .................................. 59-208782
Nov. 30, 1984 [JP] Japan .................................. 59-253599

[51] Int. Cl.$^4$ .................................................. H04N 5/782
[52] U.S. Cl. .................................... 358/310; 358/329; 358/11; 358/328; 360/33.1; 360/36.2; 360/39; 360/48
[58] Field of Search ................. 358/310, 329, 335, 11, 358/12, 13, 15, 16, 31, 328, 38–40; 360/33.1, 36.2, 39, 48; 369/59

[56] References Cited

U.S. PATENT DOCUMENTS 4,500,912 2/1985 Bolger .................................. 358/31

Primary Examiner—Robert L. Richardson
Attorney, Agent, or Firm—Michael N. Meller

[57] ABSTRACT

A video signal digital processing system comprises an A/D converter for converting an input analog video signal employing the NTSC or PAL system into a digital video signal, a first frequency converter for generating a signal sampled at a frequency $f_s$ which is a predetermined integer times a horizontal synchronizing signal frequency $f_H$ of the input analog video signal by frequency-converting the digital video signal so that the chrominance subcarrier frequency is converted into a frequency $f_s/4$, a decimation circuit for performing a ½ decimation process with respect to the output signal of the first frequency converter by extracting samples with an interval of two samples, a processing circuit for subjecting an output signal of the decimation circuit to a predetermined signal processing, an interpolation circuit for performing an interpolation process complementary to the decimation process with respect to an output signal of the processing circuit, a second frequency converter for subjecting an output signal of the interpolation circuit to a frequency conversion complementary to the frequency conversion performed in the first frequency converter, and a D/A converter for converting an output signal of the second frequency converter into a an analog video signal.

14 Claims, 12 Drawing Sheets

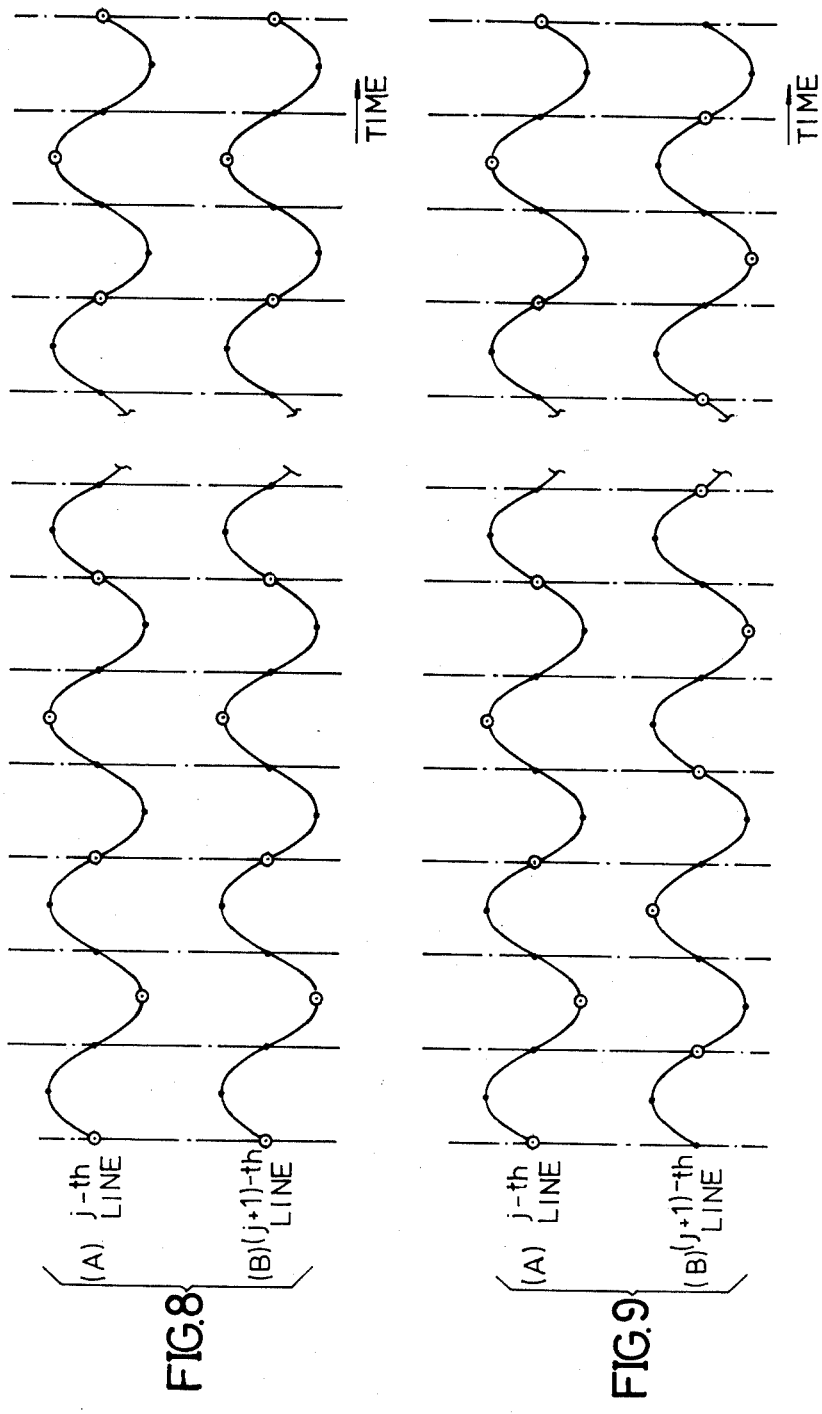

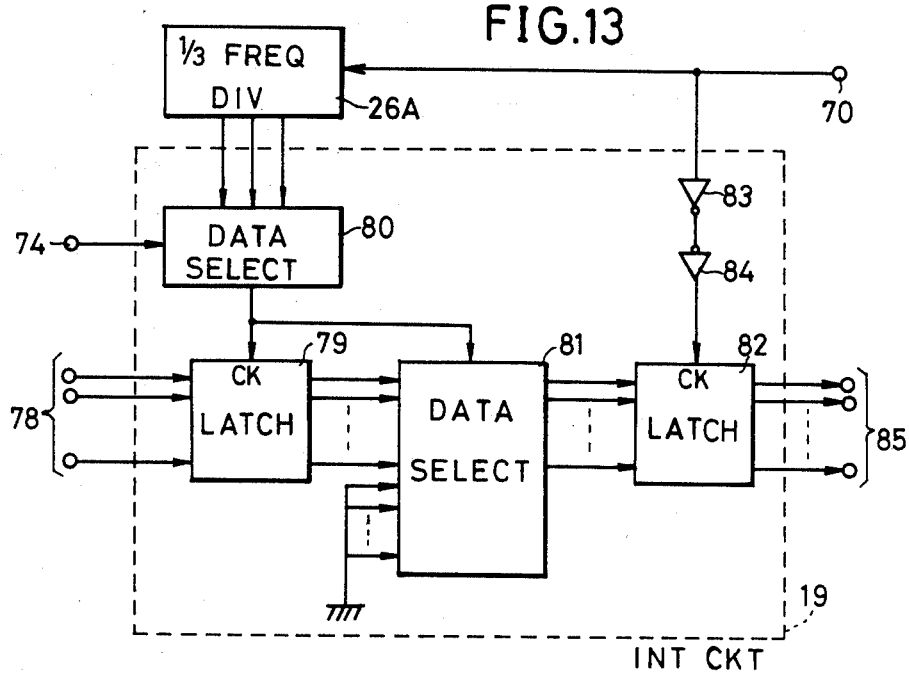
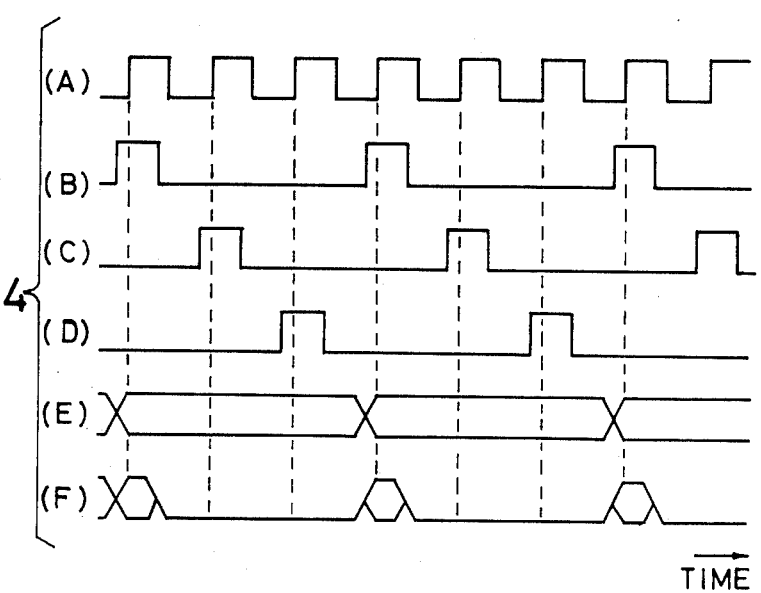

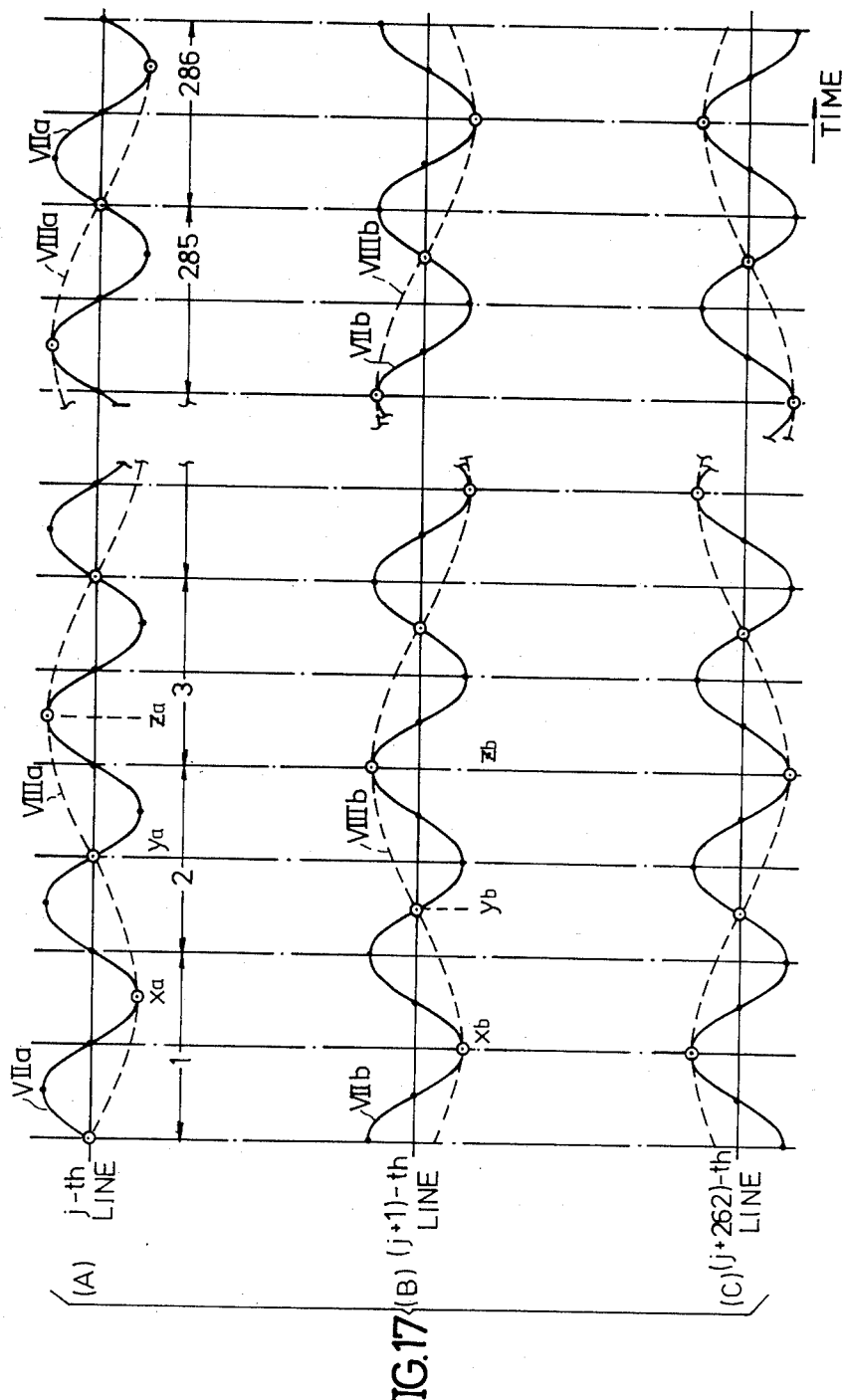

4,745,492

VIDEO SIGNAL DIGITAL PROCESSING SYSTEM USING LOWER SAMPLING FREQUENCY FOR CHROMA SIGNAL DATA DECIMATION

BACKGROUND OF THE INVENTION

The present invention generally relates to video signal digital processing systems, and more particularly to a video signal digital processing system in which a video signal is sampled at a sampling frequency which is in a predetermined relationship with a horizontal synchronizing signal frequency of the video signal so that the video signal can be processed digitally by use of a simple circuit. The same circuit can be used to digitally process the video signal regardless of whether the video signal employs the NTSC system or the PAL system.

A video signal processing circuit is used in a television receiver, a video tape recorder, and the like. A conventional processing circuit processes a video signal in the analog form, and for this reason, a large number of circuit elements such as capacitors, resistors, and coils are used and the circuit elements require adjustments. Accordingly, the conventional processing circuit is relatively expensive, and the productivity of the processing circuit is poor because the circuit elements require adjustments. Hence, there were demands to reduce the number of circuit elements of the processing circuit and to make it unnecessary to adjust the circuit elements. As a method of meeting such demands, there is the method of processing the video signal digitally.

However, the existing television broadcasting systems can be roughly divided into the NTSC system, the PAL system, and the SECAM system. Hence, it is necessary to independently prepare a digital processing circuit for digitally processing the video signal for each of the three television systems. However, the NTSC system and the PAL system are similar to some extent, and with respect to the luminance signal, there are no substantial differences between the two systems except for the frequency band of the luminance signal. Therefore, if the chrominance signal of the NTSC system video signal and the chrominance signal of the PAL system video signal can be processed in the same chrominance signal processing circuit, it becomes possible to process the NTSC video signal and the PAL system video signal in the same digital processing circuit, and the effects obtained would be great. In other words, it becomes unnecessary to independently design the digital processing circuit for the NTSC system and the PAL system, and the manufacturing cost of the digital processing circuit can be kept down to a minimum since the same digital processing circuit can be used in common for processing the NTSC system video signal and the PAL system video signal.

SUMMARY OF THE INVENTION

Accordingly, it is a general object of the present invention to provide a novel and useful video signal digital processing system in which the demands described heretofore are met.

Another and more specific object of the present invention is to provide a video signal digital processing system in which a video signal is sampled at a sampling frequency $3Mf_H$ and is then subjected to a decimation process, where M is a positive integer and $f_H$ represents the horizontal synchronizing signal frequency of the video signal. According to the video signal digital processing system of the present invention, an NTSC system video signal and a PAL system video signal can be processed by use of the same digital processing circuit.

Still another object of the present invention is to provide a video signal digital processing system in which the video signal is sampled at a sampling frequency $(3M \pm 1)f_H$ and is then subjected to a decimation process, followed by a process of compensating for positional deviations of corresponding sampled points in two mutually adjacent horizontal scanning lines along the time base. According to the video signal digital processing system of the present invention, the phase of the chrominance subcarrier matches in the two mutually horizontal scanning lines, and thus, in the case where the present invention is applied to a magnetic recording and/or reproducing apparatus, for example, crosstalk components reproduced from mutually adjacent tracks on a magnetic tape can be eliminated satisfactorily by use of a comb filter even when the corresponding sampled points in the two mutually adjacent horizontal scanning lines are positionally deviated from each other along the time base after the decimation is performed.

A further object of the present invention is to provide a video signal digital processing system in which the video signal is sampled at a sampling frequency $(3M \pm 1)f_H$ and is then subjected to a decimation process, where the phase of the decimation process is shifted for each horizontal synchronizing signal of the video signal. According to the video signal digital processing system of the present invention, corresponding sampled points in the two mutually adjacent horizontal scanning lines do not positionally deviate from each other along the time base because the phase of the decimation process is shifted for each horizontal synchronizing signal.

Another object of the present invention is to provide a video signal digital processing system in which the video signal is sampled at a sampling frequency $Nf_H$ and is then subjected to a decimation process, where N is an integer, and a number P described by a sum of a remainder $r_1$ which is obtained when N is divided by four and a remainder $r_2$ which is obtained when N is divided by three (that is, $P = r_1 + r_2$) is an even or odd number, where $N = 4K + r_1$, K is an integer, $r_1 = 0$, 1, 2, or 3, $N = 3L + r_2$, L is an integer, and $r_2 = 0$, $+1$, or $-1$. According to the video signal digital processing system of the present invention, corresponding sampled points in the two mutually adjacent horizontal scanning lines do not positionally deviate from each other along the time base after the decimation process is performed.

Other objects and further features of the present invention will be apparent from the following detailed description when read in conjunction with the accompanying drawings.

BRIEF DESCRIPTION OF THE DRAWINGS

FIGS. 8(A) and 8(B), FIGS. 9(A) and 9(B), and FIGS. 10(A) and 10(B) show signal waveforms for explaining the operation of the third embodiment of the present invention;

FIG. 13 shows an embodiment of an interpolation circuit in the block system shown in FIG. 2;

FIGS. 14(A) through 14(F) show signal waveforms for explaining the operation of the circuit shown in FIG. 13;

FIGS. 17(A) through 17(C) show signal waveforms for explaining the operation of the fifth embodiment of the present invention.

DETAILED DESCRIPTION

Figure 1A:
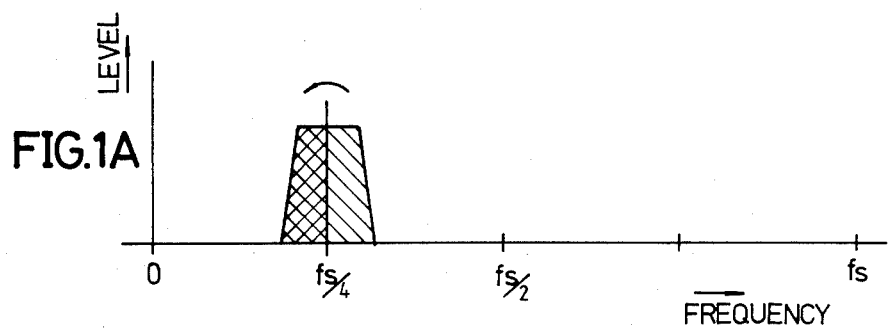
FIGS. 1A through 1C show frequency spectrums for explaining a decimation process.

Generally, when sampling an analog signal, the sampling frequency is selected over twice the maximum frequency included in the analog signal in accordance with the sampling theorem. Hence, as a first condition, a video signal must be sampled at a sampling frequency $f_s$ which is over approximately 10 MHz.

On the other hand, when processing the chrominance signal of the video signal, a comb filter is generally used to eliminate the crosstalk (noise) components. However, since the comb filter eliminates the crosstalk components by using the correlation of the video signal between two mutually adjacent horizontal scanning lines, corresponding sampled points in the two mutually adjacent horizontal scanning lines must be aligned with each other along the vertical direction of the picture. In other words, as a second condition, the sampling frequency $f_s$ must be an integral multiple of a horizontal synchronizing signal frequency $f_H$ of the video signal.

The horizontal synchronizing signal frequency $f_H(NTSC)$ of the NTSC system video signal is equal to 15.734265 kHz, and the horizontal synchronizing signal frequency $f_H(PAL)$ of the PAL system video signal is equal to 15.625 kHz. In order to sample the NTSC system video signal and the PAL system video signal at the same sampling frequency $f_s$ and at the same time satisfy the first and second conditions described above, a number $n_{NTSC}$ multiplied to the horizontal synchronizing signal frequency $f_H(NTSC)$ of the NTSC system video signal and a number $n_{PAL}$ multiplied to the horizontal synchronizing signal frequency $f_H(PAL)$ of the PAL system video signal must be in the relationship shown in the following table.

TABLE

| Number multiplied to $f_H$ | | Sampling frequency $f_s$ |
|---|---|---|
| $n_{NTSC}$ | $n_{PAL}$ | (MHz) |
| 715 | 720 | 11.25 |
| 858 | 864 | 13.50 |
| 1001 | 1008 | 15.75 |
| 1144 | 1152 | 18.00 |
| 1287 | 1296 | 20.25 |
| 1430 | 1440 | 22.50 |

When sampling the NTSC video signal and the PAL system video signal at one of the sampling frequencies $f_s$ shown in the table, the chrominance subcarrier frequencies of the two systems must be converted into a common predetermined frequency so that the video signals of the two systems can be separated into the luminance and chrominance signals and processed in the same circuit. By converting the chrominance subcarrier frequencies of the two systems into the common predetermined frequency, it becomes possible to process the chrominance signals of the two systems in the same circuit, and as a result, the video signals of the two systems can be processed digitally in the same circuit. As the common predetermined frequency, it is desirable to use a frequency $f_s/4$, for example, because the differential phase and the differential gain become minimum compared to a case where the common predetermined frequency is set to other frequencies such as $f_s/3$.

The comb filter for eliminating the crosstalk components uses a delay circuit having a delay time of 1H in the case of the NTSC video signal and 2H in the case of the PAL system video signal, where H represents one horizontal scanning period. For this reason, a memory which constitutes the delay circuit of the comb filter must have a large memory capacity when the sampling frequenc $f_s$ is set to a high frequency. Because the frequency band of the chrominance signal is narrow compared to the frequency band of the luminance signal, it becomes possible to reduce the required memory capacity of the memory by performing a so-called decimation process. The decimation process is a process in which the sampled data are extracted with an interval of one, two, three, ..., or i samples along the time base, where i is an integer, so as to essentially reduce the sampling frequency to ½, ⅓, ¼, ..., or 1/i the original sampling frequency.

For example, when an 8-bit digital video signal obtained by sampling the PAL system video signal at a sampling frequency of 18 MHz is passed through the delay circuit having the delay time of 2H, the memory constituting the delay circuit must have a memory capacity of 18,432 (=2×1152×8) bits. However, when a decimation process is performed to extract the sampled data of the digital video signal with an interval of two samples so as to essentially reduce the sampling frequency to 6 MHz which is ⅓ the original sampling frequency of 18 MHz, the required memory capacity of the memory can be reduced to 6,144 bits which is ⅓ the originally required memory capacity. As a result, the required memory capacity can be reduced by 12,288 bits. An additional circuit, that is, a decimation circuit must be provided to perform the decimation process. However, the desirable effects obtained by the provision of the decimation circuit are much greater compared to the disadvantages which are introduced by the provision of the decimation circuit. In other words, when the decimation circuit is used and the memory capacity is reduced, it becomes possible to downsize the circuit, reduce the cost of the circuit, reduce the power consumption of the circuit, and improve the reliability of the circuit.

Figure 1B:
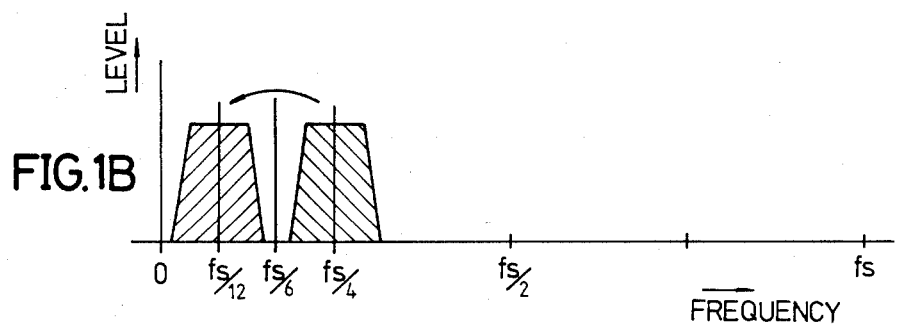
Figure 1C:
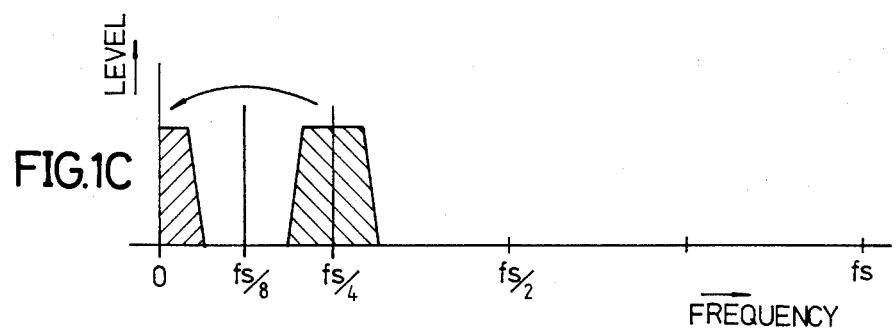

Next, description will be given with respect to a case where the decimation process is performed with respect to the video signal having the chrominance subcarrier frequency thereof converted into the frequency $f_s/4$. FIG. 1A shows the frequency spectrum of the chrominance subcarrier when a ½ decimation process is performed to extract the sampled data with an interval of one sample. In the case shown in FIG. 1A, a folded-back alias component of the signal folds back about the frequency $f_s/4$ and overlaps with a part of the chrominance subcarrier. FIG. 1C shows the frequency spectrum of the chrominance subcarrier when a ¼ decimation process is performed to extract the sampled data with an interval of three samples. In the case shown in FIG. 1C, the folded-back alias component of the signal folds back about the frequency $f_s/8$ and the chrominance subcarrier returns to the base band, and thus, problems are introduced when the signal is processed thereafter.

Accordingly, it is desirable to perform a ⅓ decimation process wherein the sampled data are extracted with an interval of two samples. FIG. 1B shows the frequency spectrum of the chrominance subcarrier when this ⅓ decimation process is performed. The folded-back alias component of the signal folds back about the frequency $f_s/6$ and the folded-back alias component does not overlap with the chrominance subcarrier. Moreover, a sufficiently wide frequency band of $\pm f_s/12$ is reserved for the folded-back alias component. As described before, the number of stages of the circuit (that is, the memory capacity of the memory) can be reduced to approximately ⅓ by performing such a ⅓ decimation process. It may be seen that the sampling frequency $f_s$ must be set to three times an integral multiple of the horizontal synchronizing signal frequency $f_H$, that is, to $3Mf_H$, where M is a positive integer, so that the corresponding sampled points in the two mutually adjacent horizontal scanning lines are aligned with each other along the vertical direction of the picture even after the decimation process is performed.

Accordingly, it may be seen from the table described before that the sampling frequency $f_s$ of the video signal should be selected to 13.50 ($=f_H(PAL) \times 864 = f_H(NTSC) \times 858$) MHz or 20.25 ($=f_H(PAL) \times 1296 = f_H(NTSC) \times 1287$) MHz. Generally, when it is assumed that $f_H(PAL)/f_H(NTSC) = 143/144$, the sampling frequency $f_s$ of the video signal should be selected to 6.75 xm, where m = 2, 3, . . . .

Next, description will be given with respect to a first embodiment of the video signal digital processing system according to the present invention by referring to FIG. 2. In the present embodiment, the video signal digital processing system is applied to a magnetic recording and/or reproducing apparatus (video tape recorder, or simply VTR) which processes the video signal digitally and records and/or reproduces the video signal on and/or from a magnetic tape. The block system of the present embodiment and block systems of second through fifth embodiments which will be described later on in the specification are the same, and for this reason, reference will be made to the block system shown in FIG. 2 when describing the second through fifth embodiments.

A composite video signal is applied to an input terminal 11 and is supplied to an analog-to-digital (A/D) converter 12. The A/D converter 12 is supplied with an output clock signal of an oscillator 25 having a frequency $f_s$ and converts the composite video signal into a digital composite video signal by sampling the composite video signal with the sampling frequency $f_s$. The output digital composite video signal of the A/D converter 12 is supplied to a frequency converter 13 wherein the chrominance subcarrier frequency of the chrominance signal is frequency-converted to a frequency $f_s/4$. In the present embodiment, the sampling frequency $f_s$ is selected to $3Mf_H$. Hence, when the composite video signal is of the NTSC system and M = 286 (m = 2), for example, $f_s = 13.50$ MHz. In this case, the frequency converter 13 frequency-converts the chrominance subcarrier frequency from 3.58 MHz to 3.375 MHz in a recording mode of the VTR (not shown), and frequency-converts the chrominance subcarrier frequency from 629 kHz to 3.375 MHz in a reproducing mode of the VTR. Since the video signal digital processing system is applied to the VTR in the present embodiment, the frequency converter 13 also performs a phase shift process in the recording mode, at the same time as the frequency conversion, so as to shift the phase of the chrominance signal by 90° for every horizontal scanning period. By performing such a phase shift process in the recording mode and performing a demodulating process of the phase shift process in the reproducing mode, it becomes possible to eliminate the crosstalk components reproduced from adjacent tracks on the magnetic tape by use of a comb filter 18 which will be described later since the phases of the crosstalk components become inverted between two mutually adjacent horizontal scanning lines. In other words, the frequency converter 13 performs the frequency conversion and the phase shift process in the recording mode, and performs the frequency conversion and the demodulating process in the reproducing mode. An output signal of the frequency converter 13 is supplied to a bandpass filter 14 wherein the signal is separated into the luminance signal and the chrominance signal responsive to the clock signal having the frequency $f_s$.

A decimation circuit 15 is supplied with the output clock signal of the oscillator 25 and an output clock signal of a ⅓ frequency divider 26 having a frequency $f_s/3$. The frequency divider 26 frequency-divides the output clock signal of the oscillator 25 by ⅓. The decimation circuit 15 subjects the chrominance signal to the 1/3 decimation process described before responsive to the two kinds of clock signals. An output signal of the decimation circuit 15 is supplied to a digital processing circuit 16 which performs digital processing such as automatic chrominance signal level control (ACC) and automatic phase control (APC) responsive to the clock signal having the frequency $f_s/3$. An output signal of the digital processing circuit 16 is passed through a filter 17 for signal processing and is supplied to the comb filter 18. The filter 17 operates resonsive to the clock signal having the frequency $f_s/3$, and is constituted by a bandpass filter, for example. The comb filter 18 does not operate in the recording mode of the VTR. In the reproducing mode, the comb filter 18 eliminates the crosstalk components described before responsive to the clock signal having the frequency $f_s/3$, and supplies an output signal thereof to an interpolation circuit 19 which performs an operation complementary to the operation of the decimation circuit 15.

The comb filter 18 has a known construction, and for example, the comb filter 18 comprises a delay circuit for delaying an input signal by a delay time of 1H (or 2H), an adder, and a switching circuit provided between the delay circuit and the adder and for supplying an output of the delay circuit to the adder only in the reproducing mode. The adder adds the output of the delay circuit and the input signal. In this case, the delay circuit comprises a number of stages equal to the number of samples remaining in one horizontal scanning line after the chrominance subcarrier is subjected to the decimation process. Accordingly, in the case where $f_s = 13.50$ MHz, for example, the comb filter 18 can use a delay circuit having 286 stages.

The interpolation circuit 19 performs an interpolation process responsive to the two kinds of clock signals so as to restore the data which have been subjected to the decimation process back into the original data, and supplies an output signal to a bandpass filter 20 which is responsive to the clock signal having the frequency $f_s$. An output signal of the bandpass filter 20 is passed through a frequency converter 21 and a digital-to-analog (D/A) converter 22 which perform operations complementary to those of the frequency converter 13 and the A/D converter 12, and an output signal of the A/D converter 22 is obtained through an output terminal 23.

Oscillators 28 and 29 supply frequency conversion data to the respective frequency converters 13 and 21. A mode discriminating signal indicating that the VTR is in a recording or reproducing mode is applied to a terminal 30, and a system discriminating signal indicating that the composite video signal employs the PAL system or the NTSC system is applied to a terminal 31. A control circuit 27 controls the output frequency conversion data of the oscillators 28 and 29 based on the mode discriminating signal and the system discriminating signal.

Figure 3A:
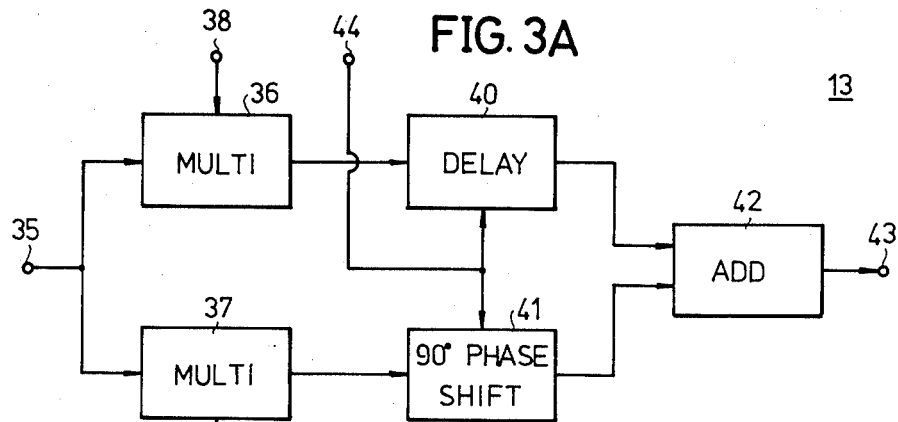
FIGS. 3A and 3B are system block diagrams respectively showing an embodiment of a frequency converter in the block system shown in FIG. 2.

An embodiment of the frequency converter 13 is shown in FIG. 3A. The output signal of the A/D converter 12 is applied to an input terminal 35 and is supplied to multipliers 36 and 37. For example, a cosine wave data from the oscillator 28 is supplied to the multiplier 36 through a terminal 38, and a sine wave data from the oscillator 28 is supplied to the multiplier 37 through a terminal 39. An output signal of the multiplier 36 is passed through a delay circuit 40 and is supplied to an adder 42, and an output signal of the multiplier 37 is passed through a 90° phase shifter 41 and is supplied to the adder 42. A Hilbert filter may be used for the 90° phase shifter 41. An output signal of the adder 42 is obtained through an output terminal 43 and is supplied to the bandpass filter 14. The output clock signal of the oscillator 25 having the frequency $f_s$ is applied to a terminal 44.

Figure 3B:
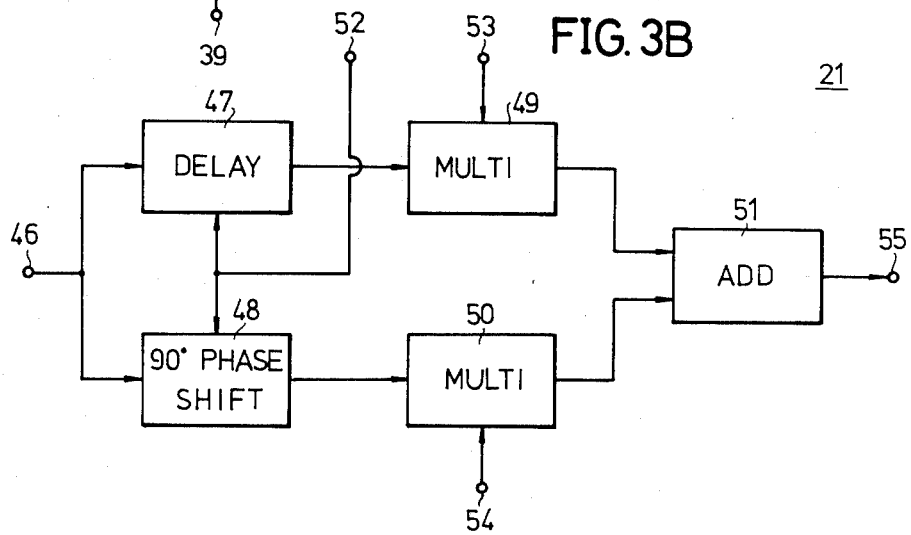

On the other hand, the frequency converter 21 performs an operation complementary to the operation of the frequency converter 13, and description on the operation of the frequency converter 21 will be omitted. For example, the frequency converter 21 is constructed as shown in FIG. 3B. In FIG. 3B, the frequency converter 21 comprises a delay circuit 47, a 90° phase shifter 48, multipliers 49 and 50, and an adder 51. The output signal of the bandpass filter 20 is applied to an input terminal 46, and an output signal of the adder 51 is obtained through an output terminal 55 and is supplied to the D/A converter 22. The output clock signal of the oscillator 25 having the frequency $f_s$ is applied to a terminal 52. Sine wave data and cosine wave data from the oscillator 29 are applied to respective terminals 53 and 54.

Next, description will be given with respect to an embodiment of the decimation circuit 15 by referring to FIG. 4 and FIGS. 5(A) through 5(D). The decimation circuit 15 comprises latch circuits 57 and 58. The output signal of the bandpass filter 14 is applied to an input terminal group 59. The output clock signal of the oscillator 25 having the frequency $f_s$ and having the waveform shown in FIG. 5(A) is applied to a clock input terminal CK of the latch circuit 57 through a terminal 60. Accordingly, data shown in FIG. 5(C) are supplied to the latch circuit 58. The output clock signal of the frequency divider 26 having the frequency $f_s/3$ and having the waveform shown in FIG. 5(B) is applied to a clock input terminal CK of the latch circuit 58 through a terminal 61. Accordingly, data shown in FIG. 5(D) are obtained from the latch circuit 58 and are supplied to the digital processing circuit 16 through an output terminal group 62. As may be seen from FIGS. 5(C) and 5(D), data of two data intervals as indicated by hatchings in FIG. 5(C) are obtained through the output terminal group 62 as shown in FIG. 5(D).

Figure 4:
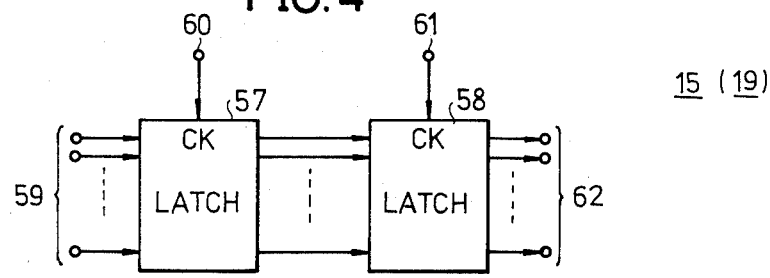
FIG. 4 shows an embodiment of a decimation circuit in the block system shown in FIG. 2.
Figure 5:
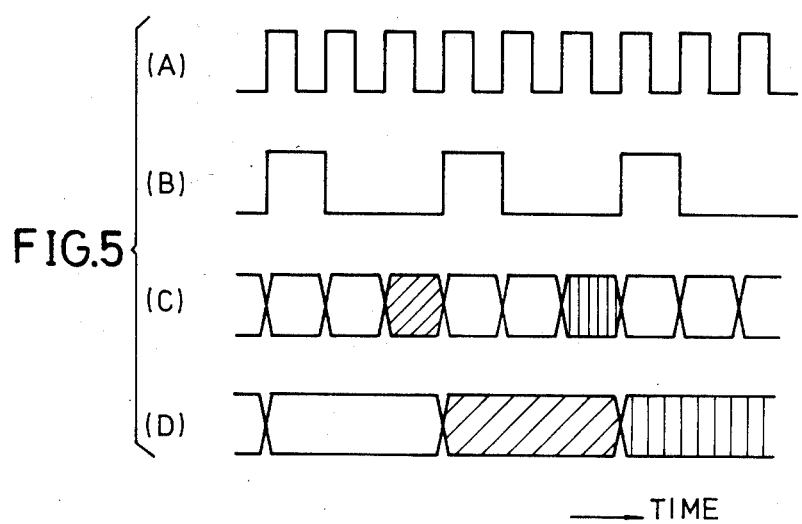
FIGS. 5(A) through 5(D) show signal waveforms for explaining the operation of the decimation circuit shown in FIG. 4.

The interpolation circuit 19 has a construction similar to that of the decimation circuit 15 shown in FIG. 4. In the case where the circuit shown in FIG. 4 is the interpolation circuit 19, the output signal of the comb filter 18 is applied to the input terminal group 59 and the signal obtained through the output terminal group 62 is supplied to the bandpass filter 20. In addition, the clock signal having the frequency $f_s/3$ is applied to the terminal 60 and the clock signal having the frequency $f_s$ is applied to the terminal 61. As a result, the same data is obtained through the output terminal group 62 for three pulses of the clock signal having the frequency $f_s$.

As described before, the phase of the chrominance signal is shifted by 90° for every 1H by the phase shift process performed in the recording mode of the VTR. The demodulating process of the phase shift process is performed in the reproducing mode and the crosstalk components are eliminated by use of the comb filter 18. However, there are cases where the corresponding sampled points in the two mutually adjacent horizontal scanning lines become deviated from each other along the time base because of the decimation process performed in the decimation circuit 15. In other words, the corresponding sampled points in the two mutually adjacent horizontal scanning lines become aligned with each other along the vertical direction of the picture only when the sampling frequency $f_s$ is selected to $3Mf_H$. The corresponding sampled points will become deviated from each other along the time base when the sampling frequency $f_s$ is selected to frequencies other than $3Mf_H$. This is because the sampling frequencies $f_s$ shown in the table described before are all three times an integral multiple of the PAL system horizontal synchronizing signal frequency $f_H(PAL)$ but not necessarily three times an integral multiple of the NTSC system horizontal synchronizing signal frequency $f_H(NTSC)$. The only cases shown in the table where the sampling frequency $f_s$ is three times an integral multiple of $f_H(PAL)$ and also three times an integral multiple of $f_H(NTSC)$, are when $f_s$ is equal to 13.50 MHz and when $f_s$ is equal to 20.25 MHz. However, when $f_s = 20.25$ MHz, it is difficult to handle the signal because of the high frequency. On the other hand, when $f_s = 13.50$ MHz, the frequency band of the chrominance subcarrier becomes approximately equal to 6 MHz and such a frequency band is not sufficient in the case of the PAL system. Hence, these problems can be eliminated by selecting the sampling frequency $f_s$ to 15.75 MHz or 18.00 MHz, but it then becomes necessary to take measures so that the corresponding sampled points in the mutually adjacent horizontal scanning lines become aligned with each other along the vertical direction of the picture after the decimation process is performed.

Figure 6:
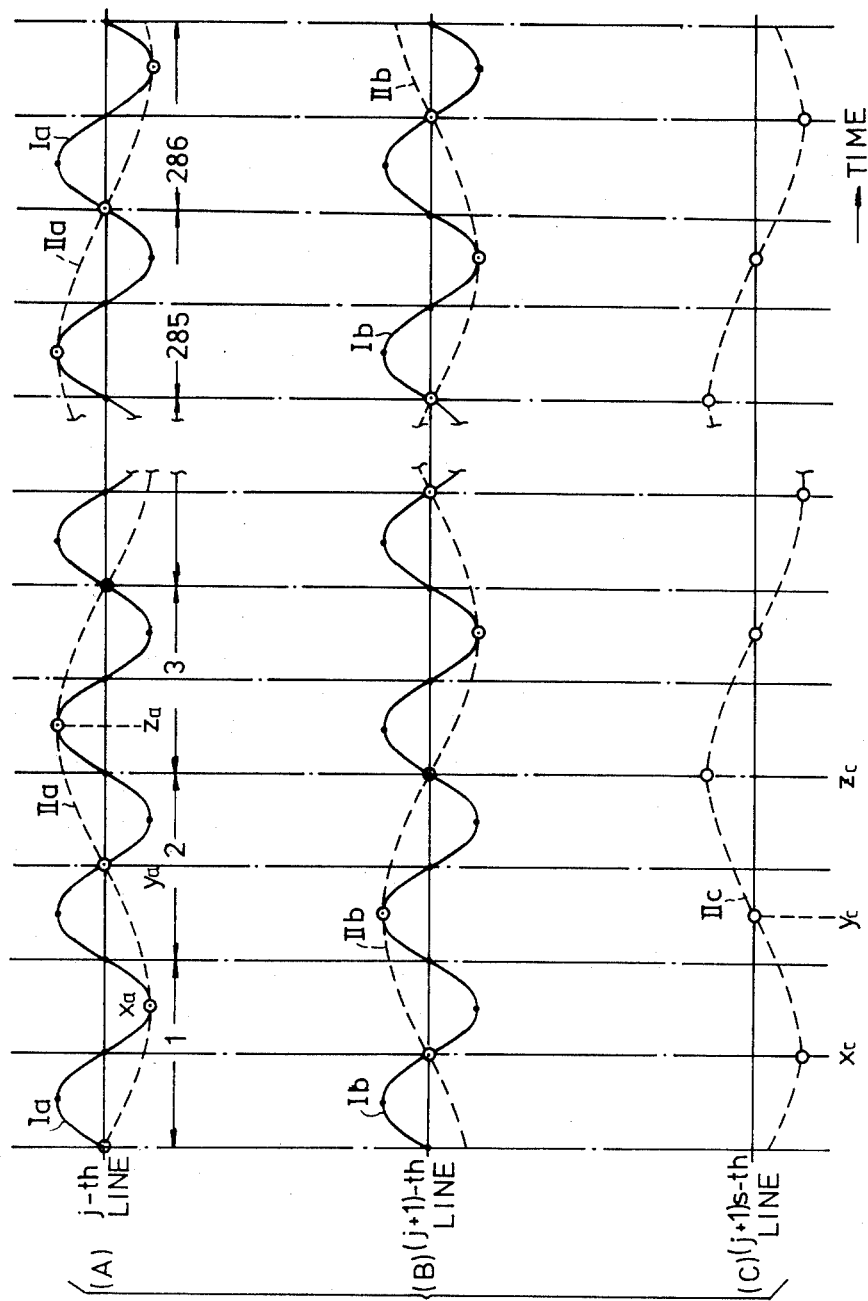
FIGS. 6(A) through 6(C) show chrominance subcarriers obtained after demodulating the chrominance subcarriers which have been subjected to a phase shift process.

Description will now be given with respect to the sampled points and the phase of the chrominance subcarrier after the decimation process is performed. FIG. 6(A) through 6(C) show waveforms of the chrominance subcarrier after the demodulating process of the phase shift process is performed in the case where $f_s=18.00$ MHz $(=f_H(\text{NTSC})\times 1144)$, the chrominance subcarrier frequency is equal to 4.5 MHz which is $f_s/4$, and 286 waves of the chrominance subcarrier exist in one horizontal scanning line. FIGS. 6(A) and 6(B) show the waveform in a j-th horizontal scanning line (hereinafter simply referred to as a line) and a (j+1)-th line, respectively. FIG. 6(C) shows the waveform obtained when the phase of the chrominance subcarrier in the (j+1)-th line is shifted by $-90°$ after the $\frac{1}{8}$ decimation process is performed. In FIGS. 6(A) through 6(C) and FIGS. 8(A), 8(B), 9(A), 9(B), 10(A), 10(B), 15(A) through 15(C), 16(A), 16(B), and 17(A) through 17(C) which will be described later, black circular marks indicate the sampled points obtained with the sampling frequency $f_s$ and white circular marks indicate the sampled points obtained after the $\frac{1}{8}$ decimation process is performed. Hence, in FIGS. 6(A) through 6(C), the black marks indicate the sampled points obtained with the sampling frequency of 18.00 MHz, and the white marks indicate the sampled points obtained after the $\frac{1}{8}$ decimation process is performed. In FIGS. 6(A) and 6(B), there are 286 chrominance subcarrier waves in one line. It will be assumed that the phases of the waves having the frequency of 4.5 MHz and indicated by solid lines $I_a$ and $I_b$ in the j-th line shown in FIG. 6(A) and the (j+1)-th line shown in FIG. 6(B) are matched with each other. The chrominance subcarrier waves which have been subjected to the $\frac{1}{8}$ decimation process and fold back about the frequency of 1.5 MHz are indicated by phantom lines $II_a$ and $II_b$. Although the phases of the 4.5 MHz waves indicated by the solid lines $I_a$ and $I_b$ match with each other, the phases of the 1.5 MHz waves indicated by the phantom lines $II_a$ and $II_b$ mutually differ by 120°.

When the phase of 1.5 MHz the chrominance subcarrier indicated by the phantom line $II_b$ is shifted by $-90°$, the wave in the (j+1)$_s$-th line becomes as indicated by a phantom line $II_c$ in FIG. 6(C). The wave $II_a$ shown in FIG. 6(A) and the wave $II_c$ shown in FIG. 6(C) mutually differ in phase by 30°, however, the phases at the sampled points after the decimation process is performed are the same at the 0°, 90°, 180°, and 270° phase of the respective waves. In addition, between the j-th and (j+1)$_s$-th lines, the phases at the sampled points (for example, sampled points $x_a$ and $x_c$, $y_a$ and $y_c$, and $z_a$ and $z_c$) which are closest to each other along the time base are the same.

Strictly speaking, the corresponding sampled points in the j-th and (j+1)$_s$-th lines are not aligned with each other along the vertical direction of the picture. However, the positional deviation of the corresponding sampled points in the j-th and (j+1)$_s$-th lines is 56 nsec (1/1144 of 1H) which is extremely small, and no problems are introduced when the phases at the corresonding sampled points are the same.

Description is given heretofore with respect to the case where the sampling frequency $f_s$ is selected to 18.00 MHz, however, similar effects can be obtained by shifting the phase of the chrominance subcarrier after the decimation process is performed even when the sampling frequency $f_s$ is selected to a frequency which is not 3 M times the horizontal synchronizing signal frequency $f_H$. That is, in a case where the sampling frequency $f_s$ is selected to $(3M+1)f_H$, the phase of the chrominance subcarrier after the decimation process is performed should be shifted by $-90°$. On the other hand, the phase of the chrominance subcarrier after the decimation process is performed should be shifted by $+90°$ in a case where the sampling frequency $f_s$ is selected to $(3M-1)f_H$.

Figure 2:
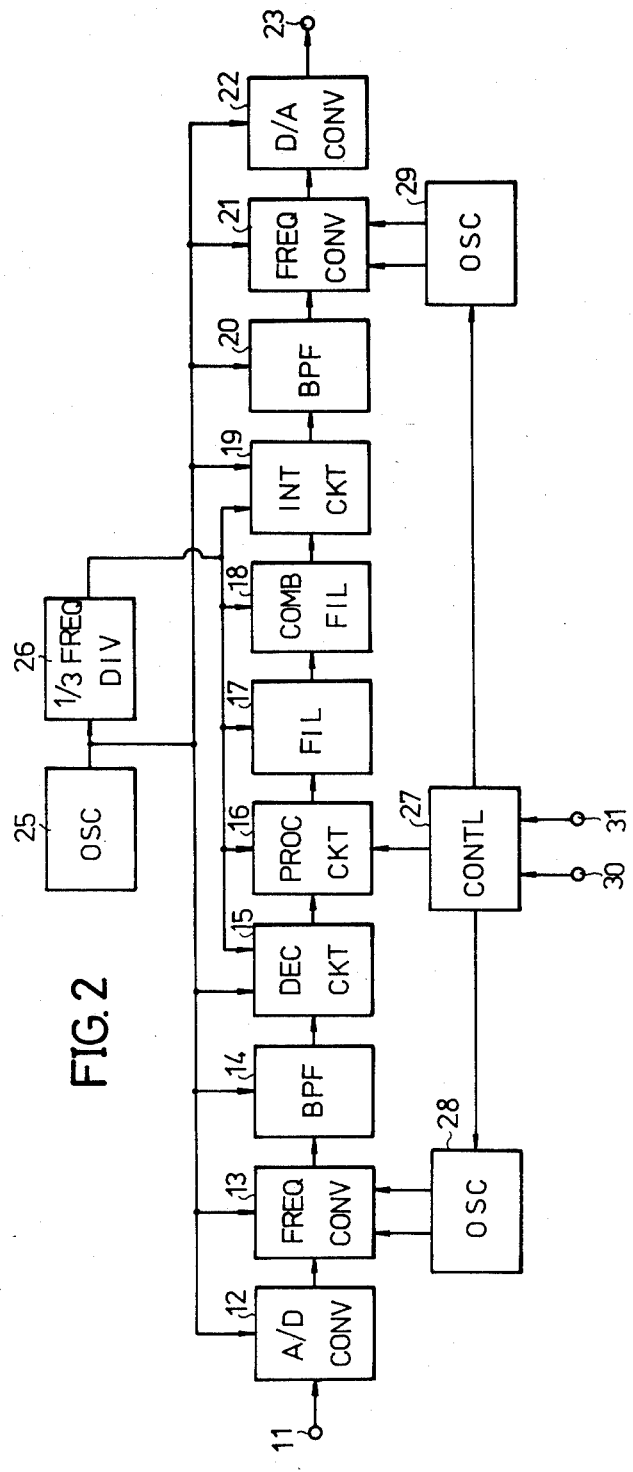
FIG. 2 is a system block diagram showing the video signal digital processing system according to the present invention, which block system is common for first through fifth embodiments of the present invention.
Figure 7:
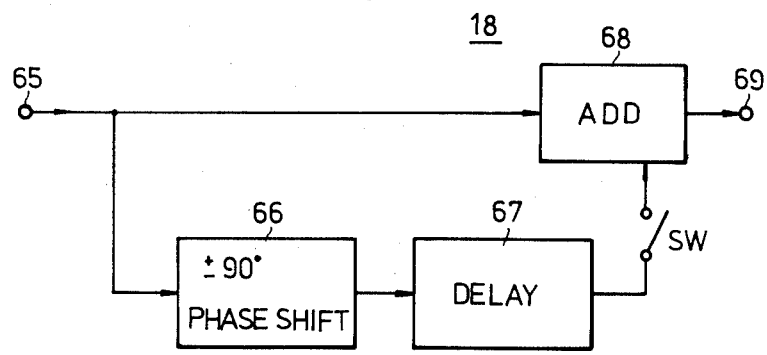
FIG. 7 shows a comb filter which constitutes an essential part of the second embodiment of the present invention.

Accordingly, in the second embodiment of the invention, the comb filter 18 shown in FIG. 2 is constructed as shown in FIG. 7. The output signal of the filter circuit 17 is applied to an input terminal 65. The signal from the input terminal 65 is supplied directly to an adder 68 on one hand, and is supplied to the adder 68 through a $\pm 90°$ phase shifter 66, a delay circuit 67, and a switch SW on the other. The switch SW is open in the recording mode of the VTR and is closed in the reproducing mode. The phase shifter 66 performs a phase shift of $-90°$ when $f_s=(3M+1)f_H$, and performs a phase shift of $+90°$ when $f_s=(3M-1)f_H$. A combined delay time of the phase shifter 66 and the delay circuit 67 is set to 1H. An output signal of the adder 68 is supplied to the interpolation circuit 19 through an output terminal 69. In the case where a subtracting circuit is used instead of the adder 68 when $f_s=(3M+1)f_H$, the phase shifter 66 should be designed to perform a phase shift of $-90°$. Hence, in the present embodiment, it is possible to eliminate the crosstalk components in the comb filter 18 without performing a demodulating process of the phase shift process. As a result, the demodulating process of the phase shift process can be performed in the frequency converter 21 in the reproducing mode.

In the present embodiment, in the case where $f_s=(3M+1)f_H=18.00$ MHz (M=381), for example, the frequency converter 13 in the recording mode frequency-converts the chrominance subcarrier from 3.85 MHz to 4.5 MHz and at the same time performs the phase shift process as in the first embodiment described before. However, in the reproducing mode, the frequency converter 13 merely frequency-converts the chrominance subcarrier from 629 kHz to 4.5 MHz and does not perform the demodulating process of the phase shift process. Accordingly, the frequency converter 21 frequency-converts the chrominance subcarrier from 4.5 MHz to 629 kHz in the recording mode, but in the reproducing mode, the frequency converter 21 frequency-converts the chrominance subcarrier from 4.5 MHz to 629 kHz and at the same time performs the demodulating process of the phase shift process. Excluding the operations of the frequency converters 13 and 21 and the comb filter 18, the operations of other parts of the system shown in FIG. 2 are basically the same as those of the first embodiment described before and description thereof will therefore by omitted.

Figure 10:
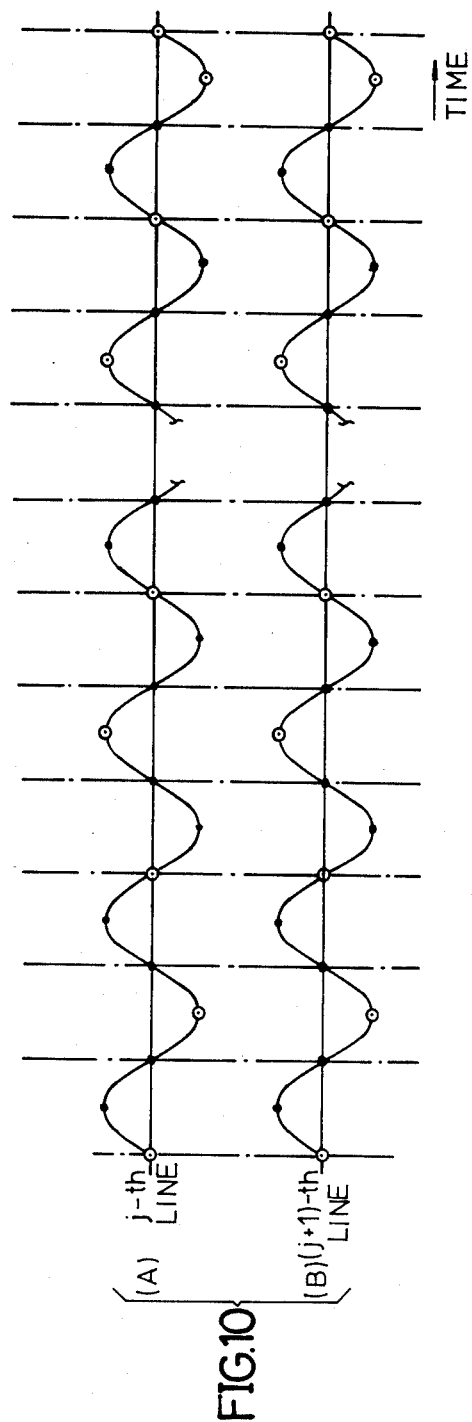

Next, description will be given with respect to the third embodiment of the present invention. In the present embodiment, the phase of the decimation process is shifted within the time period of the horizontal synchronizing signal at a rate of once per horizontal scanning line when the sampling frequency $f_s$ is selected to a frequency other than $3Mf_H$. Hence, the corresponding sampled points in the two mutually adjacent horizontal scanning lines become aligned with each other along the vertical direction of the picture even after the decimation process is performed. For example, in the case where $f_s=18.00$ MHz, $f_s$ is three times 384 (that is, $3 \times 384 = 1152$) times $f_H$(PAL), and the corresponding sampled points of the PAL system signal in the two mutually adjacent horizontal scanning lines are aligned with each other along the vertical direction of the picture even after the ⅓ decimation process is performed, as shown in FIGS. 8(A) and 8(B). However, $f_s$ in this case is 1144 times $f_H$(NTSC), and is not three times an integral multiple of $f_H$(NTSC). This, when the ⅓ decimation process is performed with respect to the NTSC system signal, the corresponding sampled points in the two mutually adjacent horizontal scanning lines becomne deviated from each other along the time base, as shown in FIGS. 9(A) and 9(B). In other words, the sampled points in the (j+1)-th line shift leftwardly in the picture by one sample compared to the sampled points in the j-th line. Accordingly, in the present embodiment, in the case where $f_s=(3M+1)f_H$, the phase of the ⅓ decimation process is shifted so that two successive sampled data are extracted at the end of each horizontal scanning period as shown in FIGS. 10(A) and 10(B). Therefore, the corresponding sampled points in the two mutually adjacent lines become aligned with each other along the vertical direction of the picture. Similarly, in the case where $f_s=(3M-1)f_H$, the phase of the ⅓ decimation process is shifted so that the sampled data are once extracted with an interval of one sample instead of two samples for every horizontal scanning period.

Figure 11:
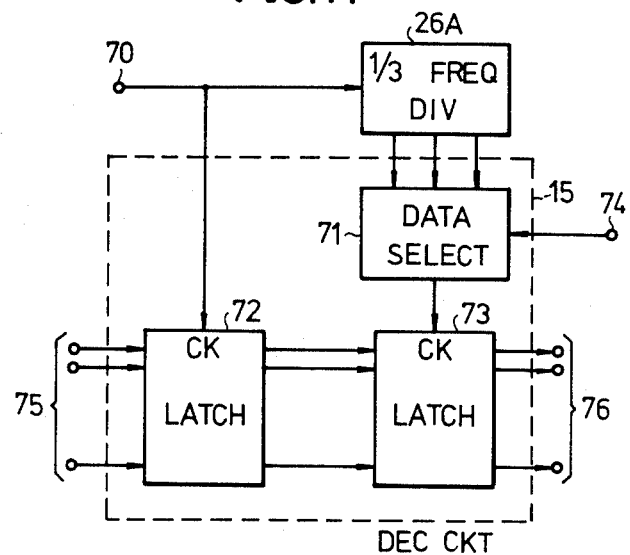
FIG. 11 shows a decimation circuit which constitutes an essential part of the third embodiment of the present invention.
Figure 12:
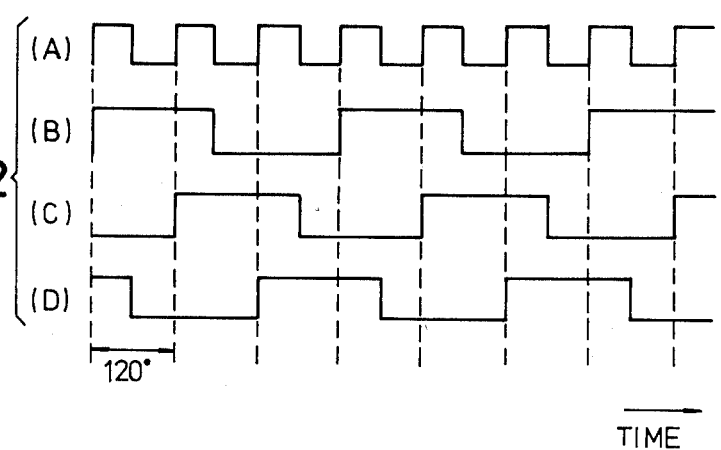
FIGS. 12(A) through 12(D) show signal waveforms for explaining the operation of the circuit shown in FIG. 11.

FIG. 11 shows an embodiment of the decimation circuit 15 which constitutes an essential part of the present embodiment. The clock signal shown in FIG. 12(A) having the frequency $f_s$ is generated from the oscillator 25 shown in FIG. 2 and is applied to an input terminal 70. A ⅓ frequency divider 26A generates first through third clock signals shown in FIGS. 12(B) through 12(D) having the frequency $f_s/3$ but mutually differing in phase by 120°. The first through third clock signals from the frequency divider 26A are supplied to a data selector 71. The data selector 71 constitutes the decimation circuit 15 together with latch circuits 72 and 73. The data selector 71 switches and selectively passes one of the first through third clock signals responsive to the horizontal synchronizing signal applied to an input terminal 74. Hence, the first through third clock signals having the frequency $f_s/3$ are successively and selectively obtained from the data selector 71 in the sequence of first, second, third, first, second, ..., clock signals. The switching of the first through third clock signals is performed at an early point within the time period of the horizontal synchronizing signal. As a result, the output signal of the bandpass filter 14 which is applied to an input terminal group 75 is latched in the latch circuit 72 responsive to the clock signal having the frequency $f_s$ and is supplied to the latch circuit 73. The latch circuit 73 latches the output signal of the latch circuit 72 responsive to one of the first through third clock signals which is obtained from the data selector 71 and has the frequency $f_s/3$. Therefore, a signal which has been subjected to a decimation process wherein the phase of the decimation process is shifted for every horizontal synchronizing signal, is obtained through an output terminal group 76 and is supplied to the digital processing circuit 16 shown in FIG. 2.

In the present embodiment, the sampling frequency $f_s$ is different from that of the first embodiment described before but the operations of the frequency converters 13 and 21 are basically the same as those of the first embodiment. For this reason, description of the entire system shown in FIG. 2 for the present embodiment will be omitted. For example, when $f_s=18.00$ MHz in the present embodiment, the delay circuit of the comb filter 18 comprises 384 stages.

The interpolation circuit 19 has a construction shown in FIG. 13 and performs an operation complementary to that of the decimation circuit 15. In FIG. 13, those parts which are the same as those corresponding parts in FIG. 11 are designated by the same reference numerals, and description thereof will be omitted. The output signal of the comb filter 18 is supplied to a latch circuit 79 through an input terminal group 78. The latch circuit 79 latches the output signal of the comb filter 18 responsive to one of the first, second, and third clock signals shown in FIGS. 14(B) through 14(D) which has the frequency $f_s/3$ and is obtained from a data selector 80. An output signal of the latch circuit 79 is supplied to a data selector 81 which selectively passes the output signal of the latch circuit 79 responsive to the first clock signal shown in FIG. 14(B), for example, and selectively passes a data zero responsive to the second or third clock signal shown in FIG. 14(C) or 14(D). The output signal of the data selector 81 is supplied to a latch circuit 82. When data shown in FIG. 14(E) are produced from the latch circuit 79, data shown in FIG. 14(F) are produced from the data selector 81. The clock signal shown in FIG. 14(A) having the frequency $f_s$ is applied to a clock input terminal CK of the latch circuit 82 through inverters 83 and 84 which are provided for the purpose of adjusting the timing. An output signal of the latch circuit 82 is supplied to the bandpass filter 20 shown in FIG. 2 through an output terminal group 85. It is possible to commonly use a single data selector for the data selector 71 shown in FIG. 11 and the data selector 80 shown in FIG. 13.

Next, description will be given with respect to the fourth embodiment of the present invention. In the present embodiment, the sampling frequency $f_s$ is selected to N times the horizontal synchronizing signal frequency $f_H$, where N is an integer. However, when a remainder obtained by dividing N by four is represented by $r_1$ and a remainder obtained by dividing N by three is represented by $r_2$, a number P described by $P=r_1+r_2$ is an integer, where $N=4K+r_1$, K is an integer, $r_1=0$, 1, 2, or 3, $N=3L+r_2$, L is an integer, and $r_2=0$, +1, or −1.

Figure 15:
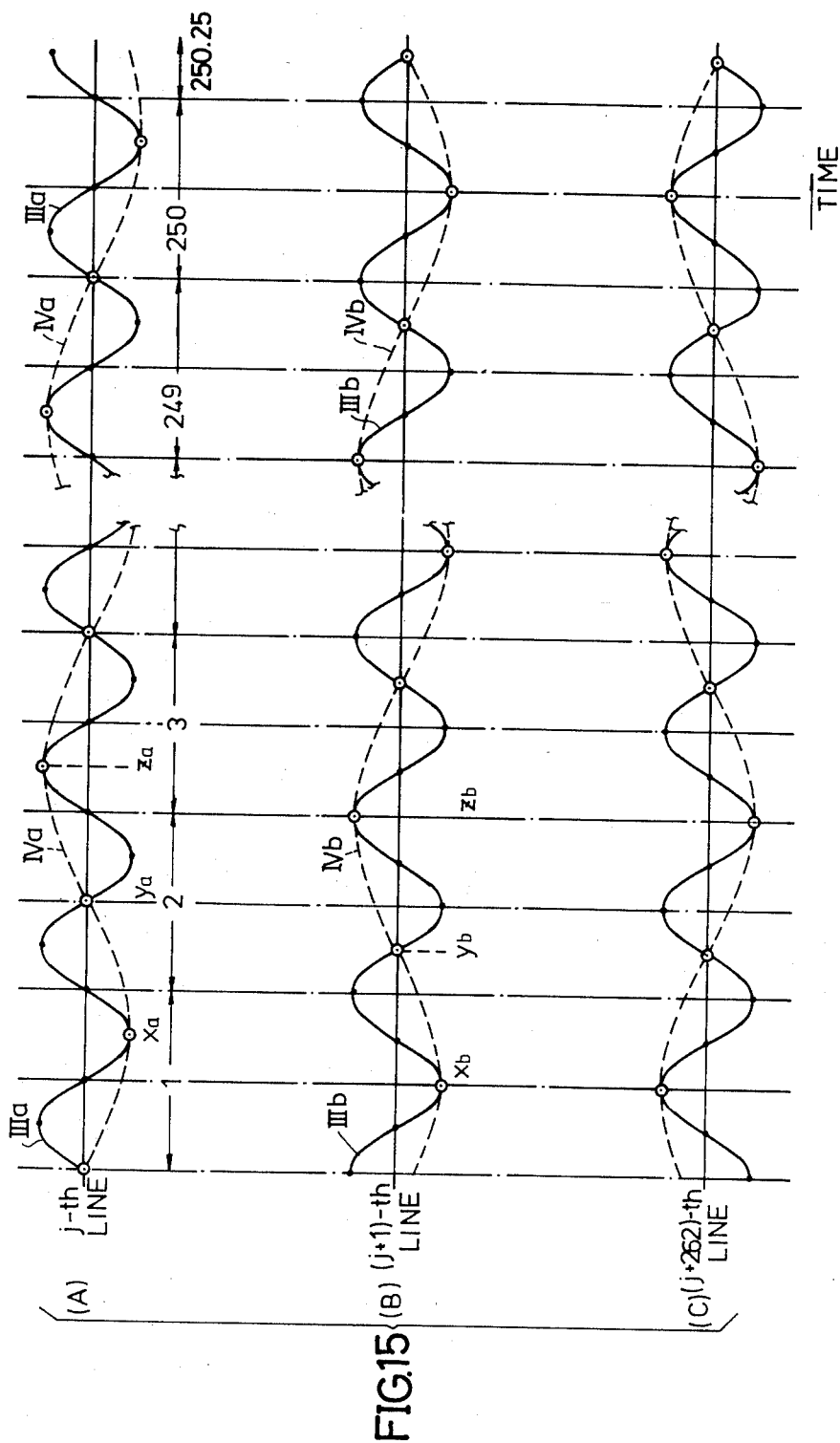
FIGS. 15(A) through 15(C) and FIGS. 16(A) and 16(B) show signal waveforms for explaining the operation of the fourth embodiment of the present invention.
Figure 16:
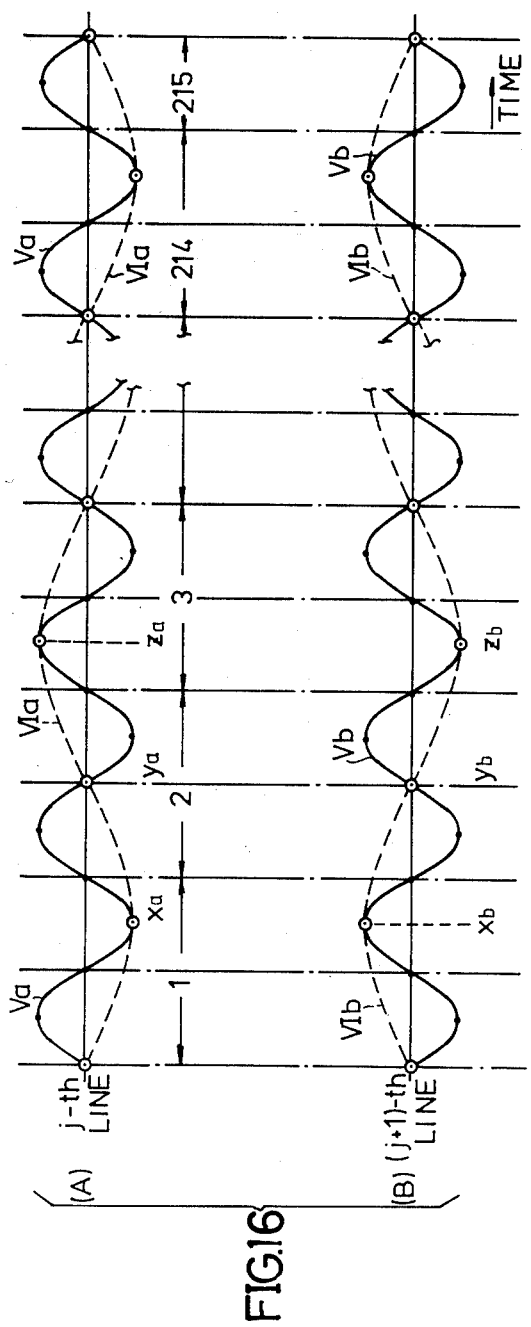

FIGS. 15(A) through 15(C) show the chrominance subcarrier in the reproducing mode of the VTR when the sampling frequency $f_s$ is selected to 15.75 MHz. In this case, $f_s=1001f_H$(NTSC), and thus, N=1001, K=250, $r_1=1$, L=334, $r_2=-1$, and P=0. The chrominance subcarrier frequency is equal to $f_s/4$ (3.9375 kHz) and there are 250.25 waves of the chrominance subcarrier in one horizontal scanning line. As may be seen from FIGS. 15(A) and 15(B), 3.9375 MHz waves indicated by solid lines III$_a$ and III$_b$ in the j-th and (j+1)-th lines mutually differ in phase by 90°. The phase of the wave in the (j+1)-th line is advanced by 90° with respect to the phase of the wave in the j-th line. On the other hand, phantom lines IV$_a$ and IV$_b$ indicate the waves of the chrominance subcarrier which is subjected to the ⅓ decimation process and folds back about a frequency of 1.3125 MHz. The 1.3125 MHz waves indicated by the phantom lines IV$_a$ and IV$_b$ in the j-th and (j+1)-th lines mutually differ in phase by 30°, however, the phases of the sampled points are the same at 0°, 90°, 180°, and 270° phase of the respective waves. In addition, between the j-th and (j+1)-th lines, the phases at the sampled points (for example, sampled points x$_a$ and x$_b$, y$_a$ and y$_b$, and z$_a$ and z$_b$) which are closest to each other along the time base are the same. Such a phase relationship also exists in a (j+262)-th line shown in FIG. 15(C) which causes the crosstalk with respect to the j-th and (j+1)-th lines.

Strictly speaking, the corresponding sampled points in the j-th and (j+1)-th lines after the decimation process is performed are not aligned with each other along the vertical direction of the picture. However, the positional deviation of the corresponding sampled points in the j-th and (j+1)-th lines is 63 nsec (1/1001 of 1H) which is extremely small, and no problems are introduced when the phases at the corresponding sampled points are the same. Accordingly, the crosstalk components can be eliminated in the reproducing mode even when the corresponding sampled points in the two mutually adjacent horizontal scanning lines positionally deviate from each other, as long as the phases at the corresponding sampled points in the two mutually adjacent horizontal scanning lines are the same.

Generally, since the chrominance subcarrier frequency is selected to f$_s$/4, the number K of the waves of the chrominance subcarrier and the remainder r$_1$ in one line can be described by the following equation (1).

$$f_s = f_H \times 4 \times K + r_1 \quad (4 > r_1 \geq 0) \quad (1)$$

When r$_1$ is not equal to zero, the phase of the chrominance subcarrier shifts by ¼×r$_1$×360° for every line. In addition, the number L of the sampled points and the remainder r$_2$ in one line after the decimation process is performed can be described the following equation (2).

$$f_s \div f_H 32 \; 3 \times L + r_2 \quad (3 > r_2 \geq 0) \quad (2)$$

When r$_1$=r$_2$, the crosstalk components can be eliminated in the reproducing mode with ease by use of a comb filter. In addition, when r$_1$≠r$_2$, the crosstalk components can be eliminated by replacing the adder of the comb filter by a subtracting circuit when an equation r$_1$−r$_2$=2 stands.

As a concrete numerical example, when f$_s$=13.50 MHz and N=858 (that is, f$_s$=858 f$_H$(NTSC)), K=214, r$_1$=2, L=286, r$_2$=0, and P=2. In this case, as may be seen from FIGS. 16(A) and 16(B), 3.375 MHz waves indicated by solid lines V$_a$ and V$_b$ in the j-th and (j+1)-th lines mutually differ in phase by 180°, and the phase of the wave in the (j+1)-th line is advanced by 180° with respect to the phase of the wave in the j-th line. On the other hand, phantom lines VI$_a$ and VI$_b$ indicate the waves of the chrominance subcarrier which is subjected to the ⅓ decimation process and folds back about a frequency of 1.125 MHz. The 1.125 MHz waves indicated by the phantom lines VI$_a$ and VI$_b$ in the j-th and (j+1)-th lines also mutually differ in phase by 180°, however, the phases of the sampled points are the same at 0°, 90°, 180°, and 270° phase of the respective waves. In addition, between the j-th and (j+1)-th lines, the phases at the sampled points (for example, sampled points x$_a$ and x$_b$, y$_a$ and y$_b$, and z$_a$ and z$_b$) which are closest to each other along the time base are the same.

From the numerical examples given above, the frequency to which f$_s$ should be selected can be generalized for the case where an inegral number of waves exist in one line without a remainder and the corresponding sampled points in the two mutually adjacent horizontal scanning lines do not positionally deviate from each other along the time base after the decimation process is performed. That is, in the present embodiment, the sampling frequency f$_s$ is selected to Nf$_H$, but when the remainder obtained by dividing N by four is represented by r$_1$ and the remainder obtained by dividing N by three is represented by r$_2$, the number P described by P=r$_1$+r$_2$ is an even number, where N=4K+r$_1$, K is an integer, r$_1$=0, 1, 2, or 3, N=3L+r$_2$, L is an integer, and r$_2$=0, +1, or −1.

In the present embodiment, the operations of the frequency converters 13 and 21 shown in FIG. 2 are basically the same as those in the first embodiment described before. Accordingly, in the recording mode, the frequency converter 13 frequency-converts the chrominance subcarrier frequency from 3.58 MHz to 3.9375 MHz, for example, and at the same time performs the phase shift process in which the phase of the chrominance signal is shifted by 90° for every horizontal scanning period. In the reproducing mode, the frequency converter 13 frequency-converts the chrominance subcarrier frequency from 629 kHz to 3.9375 MHz and at the same time performs the demodulating process of the phase shift process. In this case, when f$_s$=15.75 MHz in the present embodiment, for example, the delay circuit of the comb filter 18 comprises 334 stages.

Next, description will be given with respect to the fifth embodiment of the present invention. In the present embodiment, the sampling frequency f$_s$ is also selected to N times the horizontal synchronizing signal frequency f$_H$ as in the case of the fourth embodiment described before. When the remainder obtained by dividing N by four is represented by r$_1$ and the remainder obatined by dividing N by three is represented by r$_2$, the number P described by P=r$_1$+r$_2$ is an integer, where N=4K+r$_1$, K is an integer, r$_1$=0, 1, 2, or 3, N=3L+r$_2$, L is an integer, and r$_2$=0, +1, or −1.

FIGS. 17(A) through 17(C) show waveforms of the chrominance subcarrier in the reproducing mode when the sampling frequency f$_s$ is selected to 18.00 MHz. In this case, f$_s$=1144f$_H$(NTSC)), K=286, r$_1$=0, L=381, r$_2$=+1, and P=1. The chrominance subcarrier frequency is selected to f$_s$/4 (4.5 MHz), and 286 waves of the chrominance subcarrier exist in one horizontal scanning line. In this case, as may be seen from FIGS. 17(A) and 17(B), 4.5 MHz waves indicated by solid lines VII$_a$ and VII$_b$ in the j-th and (j+1)-th lines mutually differ in phase by 90°, and the phase of the wave in the (j+1)-th line is advanced by 90° with respect to the phase of the wave in the j-th line. On the other hand, phantom lines VII$_a$ and VIII$_b$ indicate the waves of the chrominance subcarrier which is subjected to the ⅓ decimation process and folds back about a frequency of 1.5 MHz. The 1.5 MHz waves indicated by the phantom lines VIII$_a$ and VIII$_b$ in the j-th and (j+1)-th lines also mutually differ in phase by 30°, however, the phases of the sampled points are the same at 0°, 90°, 180°, and 270° phase of the respective waves. In addition, between the j-th and (j+1)-th lines, the phases at the sampled points (for example, sampled points x$_a$ and x$_b$, y$_a$ and y$_b$, and z$_a$ and z$_b$) which are closest to each other along the time base are the same. Such a phase relationship also exists in a (j+262)-th line shown in FIG. 17(C) which causes the crosstalk with respect to the j-th and (j+1)-th lines.

Strictly speaking, the corresponding sampled points in the j-th and (j+1)-th lines after the decimation process is performed are not aligned with each other along the vertical direction of the picture. However, the positional deviation of the corresponding sampled points in the j-th and (j+1)-th lines is 56 nsec (1/1144 of 1H) which is extremely small, and no problems are introduced when the phases at the corresponding sampled points are the same. Accordingly, the crosstalk components can be eliminated in the reproducing mode without performing the demodulating process of the phase shift process even when the corresponding sampled points in the two mutually adjacent horizontal scanning lines positionally deviate from each other, as long as the phases at the corresponding sampled points in the two mutually adjacent horizontal scanning lines are the same.

The phase of the chrominance subcarrier is inverted depending on the field due to the phase shift process performed in the recording mode. For example, between a field X comprising the lines shown in FIGS. 17(A) through 17(C) and a field Y which constitutes one frame together with the field X, the phase of the chrominance subcarrier in a line of the field Y corresponding to the line of the field X shown in FIG. 17(B) is shifted by 90° with respect to the phase of the chrominance subcarrier in the line of the field X shown in FIG. 17(B). For this reason, in the field Y, the phase relationship of the corresponding sampled points in the two mutually adjacent horizontal scanning lines after the decimation process is performed is opposite to that in the field X. Hence, in the field Y, the data in the two mutually adjacent horizontal scanning lines are subjected to a subtraction instead of an addition in the comb filter so as to eliminate the crosstalk components.

Generally, the equations (1) and (2) should stand as in the case of the fourth embodiment described before. When the remainder $r_1$ is not equal to zero, the phase of the chrominance subcarrier is shifted by $\frac{1}{4} \times r_1 \times 360°$ for every horizontal scanning line. By taking into consideration the phase shift process in which the phase of the chrominance signal is shifted by 90° for every horizontal scanning period in the recording mode, the final phase shift quantity becomes equal to zero or 180° when the remainder $r_1$ is equal to one or three, and the final phase shift quantity becomes equal to $+90°$ or $-90°$ when the remainder $r_1$ is equal to zero or two. The sampled points are shifted by $r_2$ for every horizontal scanning line after the decimation process is performed.

When a quantity which is obtained by adding a quantity corresponding to the phase shift performed in the recording mode to the remainder $r_1$, coincides with a quantity which is obtained by adding the quantity corresponding to the phase shift performed in the recording mode to the remainder $r_2$, the crosstalk components can be eliminated with ease in the reproducing mode by use of a comb filter. Even when the above two quantities do not coincide with each other, the crosstalk components can be eliminated by replacing the adder of the comb filter by a subtracting circuit as in the case of processing the field Y described before when the two quantities are in an opposite phase relationship.

The frequency to which $f_s$ should be selected can be generalized for the case where an integral number of waves exist in one line without a remainder and the corresponding sampled points in the two mutually adjacent horizontal scanning lines do not positionally deviate from each other along the time base after the decimation process is performed. That is, in the present embodiment, the sampling frequency $f_s$ is selected to $Nf_H$, but when the remainder obtained by dividing N by four is represented by $r_1$ and the remainder obtained by dividing N by three is represented by $r_2$, the number P described by $P=r_1+r_2$ is an odd number, where $N=4K+r_1$, K is an integer, $r_1=0, 1, 2,$ or $3$, $N=3L+r_2$, L is an integer, and $r_2=0, +1,$ or $-1$.

In the present embodiment, the operation of the block system shown in FIG. 2 in the recording mode is basically the same as that of the fourth embodiment described before. Hence, in the recording mode, the frequency converter 13 frequency-converts the chrominance subcarrier frequency from 3.58 MHz to 4.5 MHz, for example, and at the same time performs the phase shift process in which the phase of the chrominance signal is shifted by 90° for every horizontal scanning period. In the reproducing mode, however, the frequency converter 13 simply frequency-converts the chrominance subcarrier frequency from 629 kHz to 4.5 MHz. The demodulating process of the phase shift process is performed in the reproducing mode in the frequency converter 21 which frequency-converts the chrominance subcarrier frequency from 4.5 MHz to 629 kHz. For example, when $f_s=18.00$ MHz in the present embodiment, the delay circuit of the comb filter 18 comprises 381 stages.

In each of the embodiments described heretofore, descriptions are given with respect to the cases where the video signal digital processing system according to the present invention is applied to the VTR. However, the composite video signal which is to be processed digitally in the video signal digital processing system according to the present invention is not limited to the composite video signal which is to be recorded on the magnetic tape in the VTR nor the composite video signal which is reproduced from the magnetic tape in the VTR. For example, the present invention may also be applied to a digital processing circuit within a television receiver. In this case, it is not essential to perform the phase shift process and the demodulating process of the phase shift process described before.

Moreover, the construction of the frequency converters 13 and 21 in the second through fourth embodiments is not shown in the drawings, however, this is because those skilled in the art can easily perform the necessary circuit modifications from the circuits described in conjunction with FIGS. 3A and 3B.

Further, the present invention is not limited to these embodiments, but various variations and modifications may be made without departing from the scope of the present invention.

What is claimed is:

1. A video signal digital processing system comprising:
    an analog-to-digital converting means for converting an input analog video signal employing the NTSC or PAL system into a digital video signal by sampling the input analog video signal with a sampling frequency $f_s$ which is a predetermined integer times a horizontal synchronizing signal frequency $f_H$ of the input analog video signal;
    first frequency converting means for frequency-converting the output digital video signal of said analog-to-digital converting means, said first frequency converting means frequency-converting a chrominance subcarrier frequency of the digital video signal into a frequency $f_S/4$;

decimation means for performing a ⅓ decimation process with respect to the output signal of said first frequency converting means by extracting one out of every three consecutive samples in the output signal of said first frequency converting means and decimating the remaining two out of said every three consecutive samples;

interpolation means for compensating the decimated remaining two samples by an interpolation process with respect to an output signal of said decimation means, said interpolation process being a process complementary to said decimation process performed by said decimation means;

second frequency converting means for frequency-converting an output signal of said interpolation means, said second frequency converting means performing a frequency conversion complementary to the frequency conversion performed in said first frequency converting means; and digital-to-analog converting means for generating an analog video signal by subjecting an output signal of said second frequency converting means to a digital-to-analog conversion.

2. A video signal digital processing system as claimed in claim 1 in which said predtermined integer is selected to 3 M, where M is a positive integer.

3. A video signal digital processing system as claimed in claim 2 which further comprises oscillator means for generating a first clock signal having frequency equal to the sampling frequency $f_s$ and frequency dividing means for generating a second clock signal having a frequency $f_s/3$ by frequency-dividing the first clock signal by ⅓, said decimation means comprising first latch means for latching the output signal of said first frequency converting means responsive to the first clock signal and second latch means for latching an output signal of said first latch means responsive to the second clock signal.

4. A video signal digital processing system as claimed in claim 2 which is applied to a magnetic recording and/or reproducing apparatus which successively records and/or reproduces signals on and/or from adjacent tracks on a magnetic tape, said video signal digital processing system further comprising control means supplied with an external mode discriminating signal indicating whether the magnetic recording and/or reproducing apparatus is in a recording mode or a reproducing mode, and comb filter means provided between said decimation means and said interpolation means, said control means in the recording mode controlling said first frequency converting means to perform a frequency conversion and a phase shift process in which the phase of the chrominance signal is shifted by 90° for every horizontal scanning period responsive to said external mode discriminating signal, said control means in the reproducing mode controlling said first frequency converting means to perform a frequency conversion and a demodulating process of the phase shift process responsive to said external mode discriminating signal, said comb filter means essentially passing the output signal of said decimation means as is in the recording mode but eliminating crosstalk components reproduced from adjacent tracks on the magnetic tape in the reproducing mode.

5. A video signal digital processing system as claimed in claim 1 in which said predetermined integer is selected to 3M+1, where M, is a positive integer.

6. A video signal digital processing system as claimed in claim 5 which is applied to a magnetic recording and/or reproducing apparatus which successively records and/or reproduces signals on and/or from adjacent tracks on a magnetic tape, said video signal digital processing system further comprising control means supplied with an external mode discriminating signal indicating whether the magnetic recording and/or reproducing apparatus is in a recording mode or a reproducing mode, and comb filter means provided between said decimation means and said interpolation means, said control means in the recording mode controlling said first frequency converting means to perform a frequency conversion and a phase shift process in which the phase of the chrominance signal is shifted by 90° for every horizontal scanning period responsive to said external mode discriminating signal, said control means in the reproducing mode controlling said second frequency converting means to perform a frequency conversion and a demodulating process of the phase shift process responsive to said external mode discriminating signal, said comb filter means essentially passing the output signal of said decimation means as is in the recording mode but eliminating crosstalk components reproduced from adjacent tracks on the magnetic tape in the reproducing mode.

7. A video signal digital processing system as claimed in claim 6 in which said comb filter means comprises adding means supplied with an input signal of said comb filter means, ±90° phase shifting means supplied with said input signal, delay means for delaying an output of said phase shifting means, and switching means supplied with an output of said delay means, said switching means closing only in the reproducing mode so as to supply the output of said delay means to said adding means.

8. A video signal digital processing system as claimed in claim 7 in which a combined delay time of said phase shifting means and said delay means is selected to one horizontal scanning period when said input composite video signal employs the NTSC system.

9. A video signal digital processing system as claimed in claim 5 which is applied to a magnetic recording and/or reproducing apparatus which successively records and/or reproduces signals on and/or from adjacent tracks on a magnetic tape, said video signal digital processing system further comprising control means supplied with an external mode discriminating signal indicating whether the magnetic recording and/or reproducing apparatus is in a recording mode or a reproducing mode, and comb filter means provided between said decimation means and said interpolation means, said control means in the recording mode controlling said first frequency converting means to perform a frequency conversion and a phase shift process in which the phase of the chrominance signal is shifted by 90° for every horizontal scanning period responsive to said external mode discriminating signal, said control means in the reproducing mode controlling said first frequency converting means to perform a frequency conversion and a demodulating process of the phase shift process resonsive to said external mode discriminating signal, said comb filter means essentially passing the output signal of said decimation means as is in the recording mode but eliminating crosstalk components reproduced from adjacent tracks on the magnetic tape in the reproducing mode.

10. A video signal digital processing system as claimed in claim 9 which further comprises oscillator means for generating a first clock signal having a frequency equal to the sampling frequency $f_s$ and frequency dividing means for frequency-dividing the first clock signal by $\frac{1}{3}$ and for generating second through fourth clock signals having a frequency $f_s/3$ but mutually differing in phase by 120°, said decimation means comprising data selector means for selectively passing one of said second through fourth clock signals for every one horizontal scanning period, first latch means for latching the output signal of said first frequency converting means responsive to said first clock signal, and second latch means for latching an output signal of said first latch means responsive to an output clock signal of said data selector means.

11. A video signal digital processing system as claimed in claim 1 in which said predetermined integer is selected to N, where N is an integer, and a number P described by $P=r_1+r_2$ is an even number, where $r_1$ represents a remainder obtained by dividing N by four and $r_2$ represents a remainder obtained by dividing N by three, $N=4K+r_1$, K is an integer, $r_1=0, 1, 2,$ or $3$, $N=3L+r_2$, L is an integer, and $r_2=0, +1,$ or $-1$.

12. A video signal digital processing system as claimed in claim 11 which is applied to a magnetic recording and/or reproducing apparatus which successively records and/or reproduces signals on and/or from adjacent tracks on a magnetic tape, said video signal digital processing system further comprising control means supplied with an external mode discriminating signal indicating whether the magnetic recording and/or reproducing apparatus is in a recording mode or a reproducing mode, and comb filter means provided between said decimation means and said interpolation means, said control means in the recording mode controlling said first frequency converting means to perform a frequency conversion and a phase shift process in which the phase of the chrominance signal is shifted by 90° for every horizontal scanning period responsive to said external mode discriminating signal, said control means in the reproducing mode controlling said first frequency converting means to perform a frequency conversion and a demodulating process of the phase shift process responsive to said external mode discriminating signal, said comb filter means essentially passing the output signal of said decimation means as is in the recording mode but eliminating crosstalk components reproduced from adjacent tracks on the magnetic tape in the reproducing mode.

13. A video signal digital processing system as claimed in claim 1 in which said predetermined integer is selected to N, where N is an integer, and a number P described by $P=r_1+r_2$ is an odd number, where $r_1$ represents a remainder obtained by dividing N by four and $r_2$ represents a remainder obtained by dividing N by three, $N=4K+r_1$, K is an integer, $r_1=0, 1, 2,$ or $3$, $N=3L+r_2$, L is an integer, and $r_2=0, +1,$ or $-1$.

14. A video signal digital processing system as claimed in claim 13 which is applied to a magnetic recording and/or reproducing apparatus which successively records and/or reproduces signals on and/or from adjacent tracks on a magnetic tape, said video signal digital processing system further comprising control means supplied with an external mode discriminating signal indicating whether the magnetic recording and/or reproducing apparatus is in a recording mode or a reproducing mode, and comb filter means provided between said decimation means and said interpolation means, said control means in the recording mode controlling said first frequency converting means to perform a frequency conversion and a phase shift process in which the phase of the chrominance signal is shifted by 90° for every horizontal scanning period responsive to said external mode discriminating signal, said control means in the reproducing mode controlling said second frequency converting means to perform a frequency conversion and a demodulating process of the phase shift process responsive to said external mode discriminating signal, said comb filter means essentially passing the output signal of said decimation means as is in the recording mode but eliminating crosstalk components reproduced from adjacent tracks on the magnetic tape in the reproducing mode.

* * * * *